US008145913B1

(12) United States Patent
Zaitsev

(10) Patent No.: US 8,145,913 B1
(45) Date of Patent: Mar. 27, 2012

(54) SYSTEM AND METHOD FOR PASSWORD PROTECTION

(75) Inventor: Oleg V. Zaitsev, Smolensk (RU)

(73) Assignee: Kaspersky Lab Zao, Moscow (RU)

( * ) Notice: Subject to any disclaimer, the term of this patent is extended or adjusted under 35 U.S.C. 154(b) by 0 days.

(21) Appl. No.: 13/220,918

(22) Filed: Aug. 30, 2011

(51) Int. Cl.
*H04L 29/06* (2006.01)
(52) U.S. Cl. .......................................... 713/183; 726/22
(58) Field of Classification Search ................... 713/183; 726/22, 23
See application file for complete search history.

(56) References Cited

U.S. PATENT DOCUMENTS

| 5,354,974 | A * | 10/1994 | Eisenberg | 235/379 |
| 5,731,575 | A * | 3/1998 | Zingher et al. | 235/379 |
| 5,774,858 | A * | 6/1998 | Taubkin et al. | 704/273 |
| 6,196,846 | B1 * | 3/2001 | Berger et al. | 434/118 |
| 6,334,121 | B1 * | 12/2001 | Primeaux et al. | 706/62 |
| 6,679,422 | B2 * | 1/2004 | Brown et al. | 235/379 |
| 6,766,456 | B1 * | 7/2004 | McKeeth | 726/2 |
| 6,871,288 | B2 * | 3/2005 | Russikoff | 726/19 |
| 7,305,559 | B2 | 12/2007 | Schreiber et al. | |
| 7,552,467 | B2 * | 6/2009 | Lindsay | 726/5 |
| 7,581,113 | B2 | 8/2009 | Smith et al. | |
| 7,698,740 | B2 * | 4/2010 | Oka et al. | 726/22 |
| 7,870,491 | B1 * | 1/2011 | Henderson et al. | 715/745 |
| 7,877,612 | B2 | 1/2011 | McKeeth | |
| 2003/0141372 | A1 * | 7/2003 | Brown et al. | 235/487 |
| 2003/0144952 | A1 * | 7/2003 | Brown et al. | 705/40 |
| 2004/0168092 | A1 * | 8/2004 | Adachi | 713/202 |
| 2005/0075964 | A1 * | 4/2005 | Quinn et al. | 705/37 |
| 2006/0069955 | A1 * | 3/2006 | Oka et al. | 714/25 |
| 2006/0259491 | A1 * | 11/2006 | Hooper et al. | 707/9 |
| 2007/0250920 | A1 * | 10/2007 | Lindsay | 726/7 |
| 2007/0277235 | A1 * | 11/2007 | Barrett et al. | 726/12 |
| 2009/0193518 | A1 | 7/2009 | Craine | |
| 2009/0241185 | A1 * | 9/2009 | Waterland | 726/18 |
| 2009/0259588 | A1 * | 10/2009 | Lindsay | 705/40 |
| 2010/0036783 | A1 * | 2/2010 | Rodriguez | 706/15 |
| 2010/0261486 | A1 * | 10/2010 | Sheha et al. | 455/457 |
| 2010/0275257 | A1 * | 10/2010 | Nishida | 726/19 |
| 2010/0318807 | A1 * | 12/2010 | Wang | 713/184 |
| 2011/0154459 | A1 * | 6/2011 | Kuang et al. | 726/6 |

FOREIGN PATENT DOCUMENTS

WO 02075564 A1 9/2002

* cited by examiner

*Primary Examiner* — David Garcia Cervetti

(74) *Attorney, Agent, or Firm* — Arent Fox LLP; Michael Fainberg

(57) ABSTRACT

Disclose are system, method and computer program product for protecting passwords from interception. An example method comprise: intercepting a plurality of data entry events generated by a data entry device, wherein the plurality of data entry events comprise a user-entered password; detecting an anomaly event in the plurality of intercepted data entry events; comparing the detected anomaly event with one or more preset anomalies; if the detected anomaly event matches at least one preset anomaly, identifying a replacement character string associated with said at least one preset anomaly; replacing the detected anomaly event in the plurality of intercepted data entry events with the replacement character string to generate a converted password; and sending the converted password instead of the user-entered password to a user authentication device for authentication of the user.

20 Claims, 6 Drawing Sheets

SYSTEM AND METHOD FOR PASSWORD PROTECTION

TECHNICAL FIELD

The present disclosure generally relates to the field of computer security, and specifically to systems, methods and computer program products for protecting passwords from interception.

BACKGROUND

Computer systems and electronic devices often use identity authentication, which is a system access procedure for entry of user identity data and verification of the user's access rights to various resources, programs, and data. Currently, the username and password based authentication is the most commonly used identity verification method. This method uses an authentication form, which prompts a user to enter username and password and forwards the received information for verification. The following are the authentication form examples: password entry field giving access to operating system, username and password entry fields at various Internet sites, PIN code entry field which appears during switching on of a cell phone, etc. Such identity authentication method has one essential drawback—the password may be intercepted by a hacker using various methods, such as keyloggers, which is a software or hardware devices that may record user's actions at the input device (including keystrokes); visual password entry recording using special equipment (i.e. hidden video camera); by hacker being present at the spot where the password entry takes place; or password retrieval by the hacker from an unreliable storage place or by hacking a weak password.

For effective prevention of password interception it is desirable to use an approach where partial or entire password entry is performed by methods which cannot be intercepted or recorded directly or indirectly by a hacker or his means of interception.

All current password intercept protection systems have such deficiencies as limited applicability or incomplete password protection from interception methods.

SUMMARY

Disclosed are systems, methods and computer program products for protecting passwords from interception. In one example embodiment, the system for password protection comprises a password interception module configured to intercept a plurality of data entry events generated by a data entry device, wherein the plurality of data entry events comprises a user-entered password. The system further includes an anomaly detection module configured to detect an anomaly event in the plurality of intercepted data entry events. The system further includes a database storing one or more preset anomalies and replacement character strings. The system further includes a password conversion module configured to compare the detected anomaly event with the one or more preset anomalies stored in the database. If the detected anomaly event matches at least one preset anomaly, the conversion module identifies a replacement character string associated with said at least one preset anomaly. The conversion module then replaces the detected anomaly event in the plurality of intercepted data entry events with the replacement character string to generate a converted password, and sends the converted password instead of the user-entered password to a user authentication device for authentication of the user based at least on the converted password.

In one example embodiment, the method comprises intercepting a plurality of data entry events generated by a data entry device, wherein the plurality of data entry events comprise a user-entered password; detecting an anomaly event in the plurality of intercepted data entry events; comparing the detected anomaly event with one or more preset anomalies; if the detected anomaly event matches at least one preset anomaly, identifying a replacement character string associated with said at least one preset anomaly; replacing the detected anomaly event in the plurality of intercepted data entry events with the replacement character string to generate a converted password; and sending the converted password instead of the user-entered password to a user authentication device for authentication of the user.

The above simplified summary of example embodiment(s) serves to provide a basic understanding of the invention. This summary is not an extensive overview of all contemplated aspects of the invention, and is intended to neither identify key or critical elements of all embodiments nor delineate the scope of any or all embodiments. Its sole purpose is to preset one or more embodiments in a simplified form as a prelude to the more detailed description of the invention that follows. To the accomplishment of the foregoing, the one or more embodiments comprise the features described and particularly pointed out in the claims.

BRIEF DESCRIPTION OF THE DRAWINGS

The accompanying drawings, which are incorporated into and constitute a part of this specification, illustrate one or more example embodiments of the invention and, together with the detailed description serve to explain their principles and implementations.

In the drawings.

DETAILED DESCRIPTION OF EXAMPLE EMBODIMENTS

Example embodiments of the present invention are described herein in the context of systems, methods and computer program products for protecting passwords. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments of the invention as illustrated in the accompanying drawings. The same reference indicators will be used to the extent possible throughout the drawings and the following description to refer to the same or like items.

Figure 1:
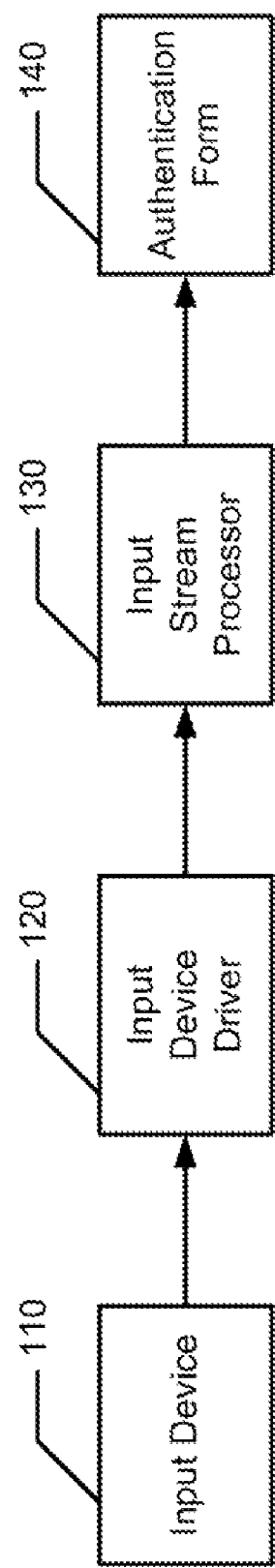
FIG. 1 illustrates a schematic diagram of an exemplary password entry system.

FIG. 1 shows a schematic diagram of a password entry system. An input device 110, such as a keyboard, receives a data entry event, such as a keystroke, which is processed by an input device driver 120 and transmitted to an input stream processor 130. A keyboard driver stack (or its part) used in Windows® operating systems may serve as an example of an input device driver 120. The input stream processor 130 converts the received events into messages, which are transmitted to identity authentication form 140.

Figure 2:
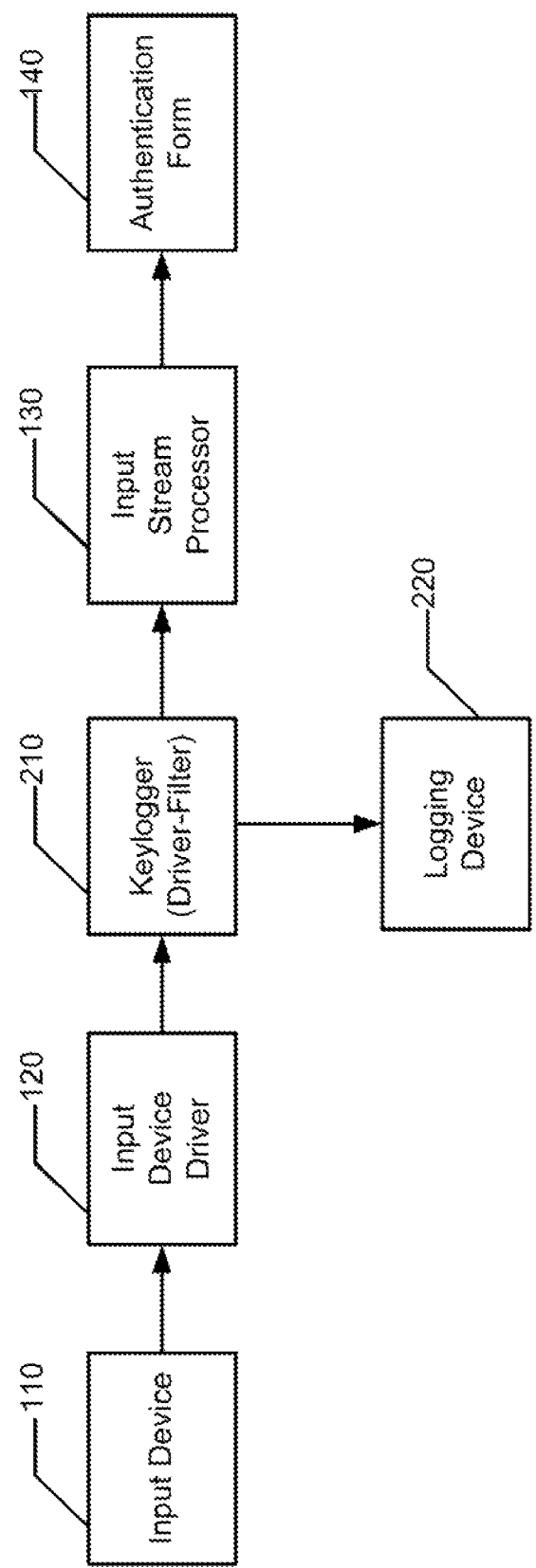
FIG. 2 illustrates a schematic diagram demonstrating operating principles of a driver filter-type keylogger.

FIG. 2 shows a schematic diagram of a password entry system having a keylogger software deployed thereon. A keylogger 210, serving as a driver-filter, is connected to the input device driver 120. Therefore, the input device 110 event processed by the input device driver 120 is then transmitted to the keylogger 210. Keylogger 210 in turn transmits information on the event (e.g., a keystroke) to a logging device 220, and the event is passed to the input stream processor 130 and to the identity verification form 140.

Figure 3:
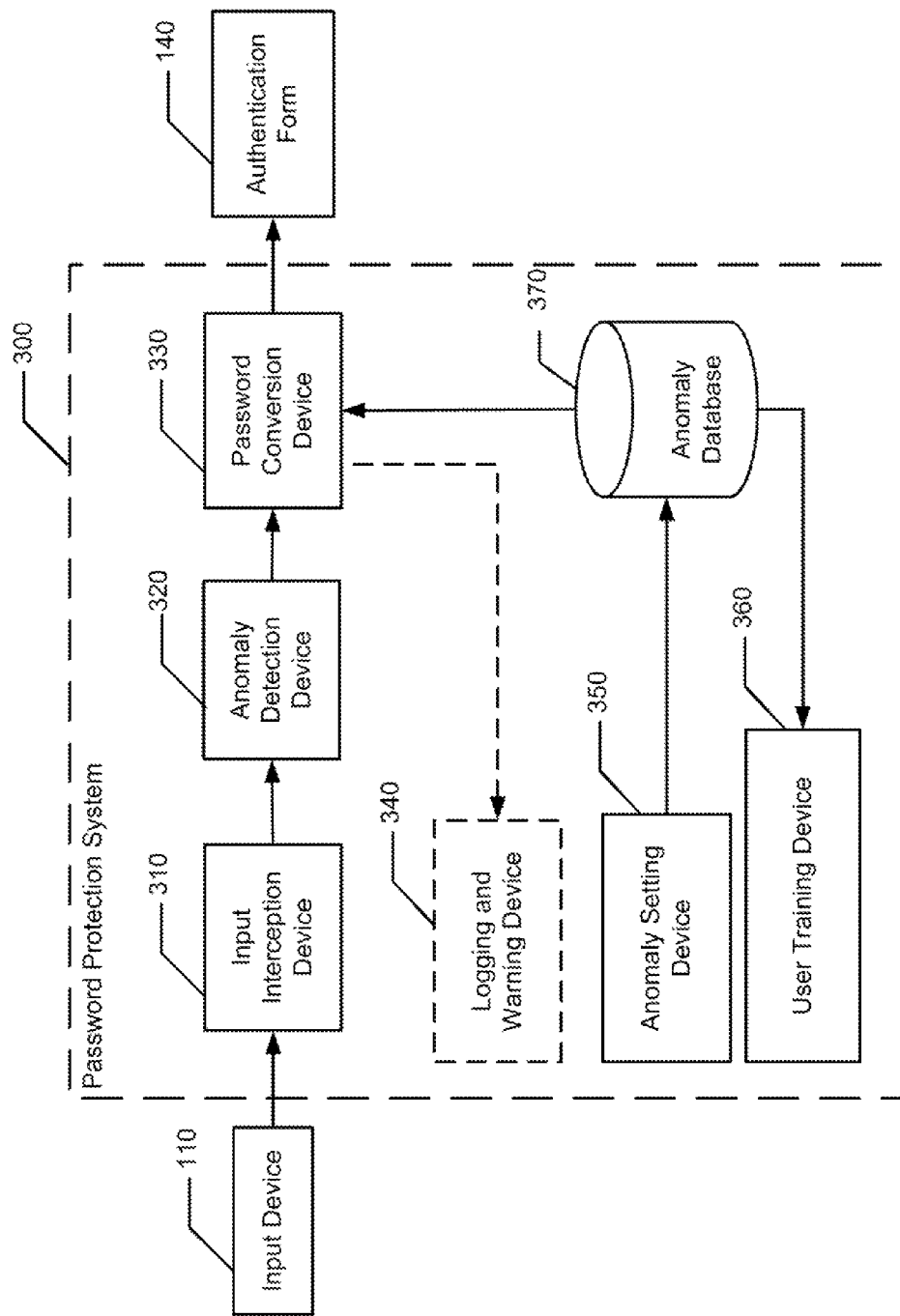
FIG. 3 illustrates a schematic diagram of a password protection system in accordance with one example embodiment.

FIG. 3 shows a schematic diagram of a password protection system in accordance with one example embodiment of the present invention. The password protection system 300 comprises an input interception device 310, an anomaly detection device 320, and a password conversion device 330. The input of the password protection system 300 is the password received from the input device 110. The output of the password protection system 300 is a converted password provided to the identity authentication form 140. In one example embodiment, the password protection system 300 may also include an anomaly setting device 350, a user training device 360, and an anomalies database 370.

In one example embodiment, an anomaly setting device 350 of the password protection system 300 provides a user interface that allows a user to set the input anomaly parameters that he/she wants to use during password entry. In this case, "input anomaly" means any deviation of dynamic characteristics during password entry using the input device from the user-intrinsic dynamic characteristics, or use of non-standard input methods.

One example of anomaly parameters that may be set by the user is the type of input anomaly. Some examples of different types of password input anomalies include:

Time delay between entry of two certain password characters, which is larger than the user-intrinsic time delays between entries of the rest of the password characters;

Overlay of keystrokes corresponding to a certain sequence of the password character pairs. This anomaly suggests the password entry method in which the keystroke for the second character in a certain password character pairs sequence takes place before the key for the first character in this character pair sequence is released. In this case the password is entered correctly, since the system hardware entry model allows for keystrokes overlay during entry;

Mouse click at a certain password entry point.

The above anomaly types are some of the examples of possible anomalies. The password protection system allows using other password entry anomalies.

Besides using several different types of entry anomaly during password entry, the password protection system 300 also allows using several entry anomalies of the same type. Therefore, in order to unambiguously identify password anomalies of the same type, the parameters set in the anomaly setting device 350 also include sequence numbers of entry anomalies of the same type. Besides, a user may set a character string for each particular anomaly in the anomaly setting device 350, which replaces this particular anomaly in the password that is entered into the authentication form 140.

Entry anomaly parameters set by a user in the anomaly setting device 350 and their corresponding character strings may be stored in the anomalies database 370.

The password protection system 300 operates in the following manner. Once a password is entered through the input device 110, it is intercepted by the input intercept device 310. The input intercept device 310 then transmits the intercepted password to the anomaly detection device 320, which analyzes the entered password for anomalies and determines parameters of the anomalies used in the entered password. After determination of the password anomalies, the anomaly detection device 320 transmits the password, along with data on its input anomalies, to the password conversion device 330. The password conversion device 330 queries the anomalies database 370 to search for matches between the input anomalies and the set parameters associated with the anomaly stored in the database 370. If a one or more matches are found in the anomalies database 370, the password conversion device 330 replaces the password anomalies with the corresponding character strings. Such converted password is then transmitted to the user identity authentication form 140.

In one example embodiment, password protection system 300 may also include a user training device 360. Device 360 provides a user interface configured to train a user in correct password entry in accordance with anomaly parameters stored in the anomalies database 370, as well as to give user an opportunity to train for the correct password entry with these anomalies.

In one example embodiment, password protection system 300 may also include a logging and warning device 340. Device 340 is configured to receive from the password conversion device 330 data on successful and unsuccessful results of searches for matches between the input password parameters and set anomaly parameters. The logging and warning device 340 provides for storage of the received data and may also display a warning to the user, who successfully passed identity authentication, about cases where input anomalies did not correspond to set anomalies or cases where anomalies were absent during password entry. This information may be useful in identifying unauthorized password entry attempts.

In one of the embodiments, the password protection system 300 is configured to monitor the entered password accuracy and to detect instances where the password has become known to a hacker. In this case, the user may use the anomaly setting device 350 to set a character password in which he plans to use the set anomalies, and to determine location of each defined anomaly in such character password. This information is then transmitted for storage to the anomalies database 370. In this embodiment, during password entry, the password conversion device 330 queries the anomalies database 370 for any matches between the entered and set character passwords, anomaly parameters, and their locations in the passwords. The password conversion device 330 transmits successful and unsuccessful search results to the logging and warning device 340. The logging and warning device 340 stores the received data and may also warn the successfully identity verified user of any prior instances where the entered passwords and their anomalies did not agree with the settings. An instance where the entered character password matches the set one, but its anomalies do not match or are absent, may indicate that the password is now known to a hacker.

In another embodiment, the password protection system 300 may also be an identity verification system and may verify the user's identity only on the basis of entered character passwords and their anomaly parameters and locations matching those stored in the anomaly database 370, without replacing password anomalies with character strings.

Figure 4:
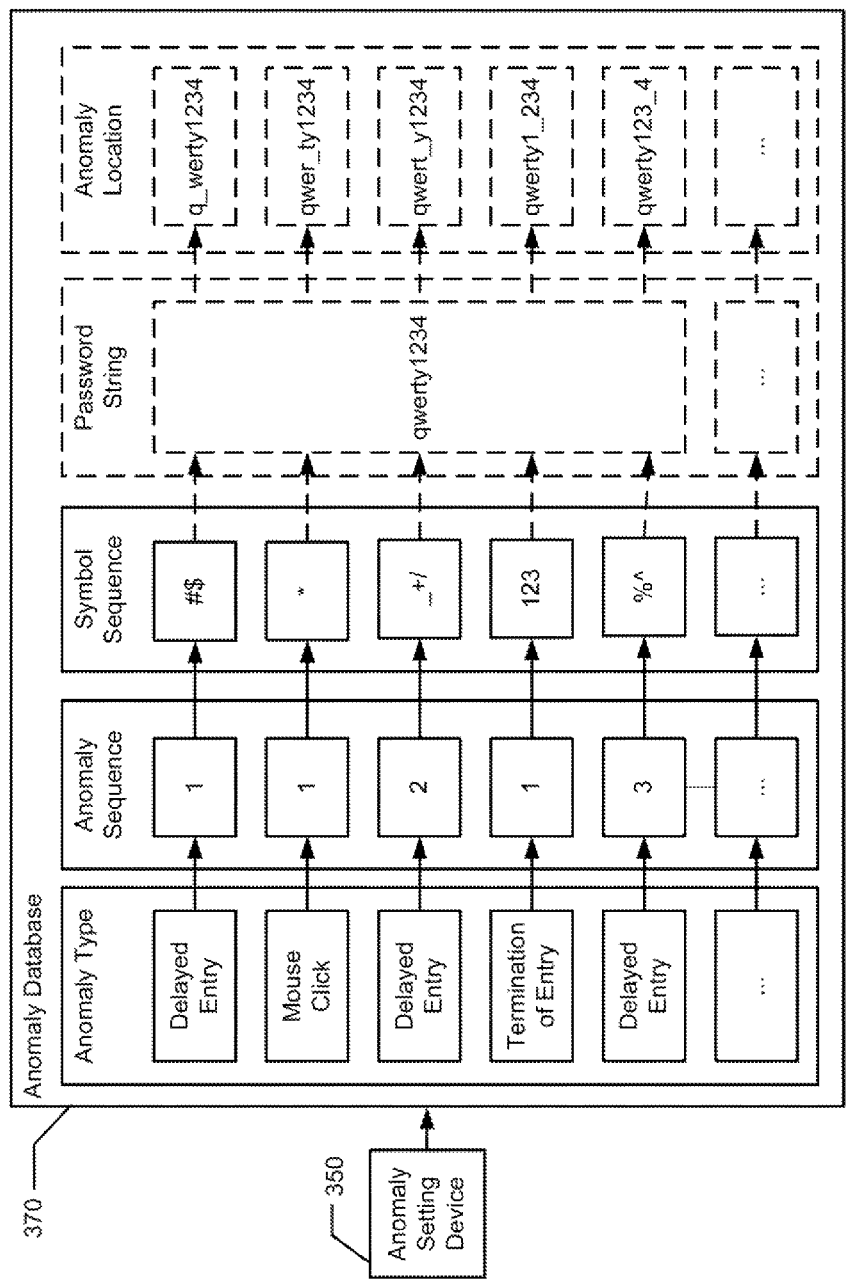
FIG. 4 illustrates an anomalies database in accordance with one example embodiment.

FIG. 4 shows a schematic configuration of the anomalies database 370 in accordance with one example embodiment.

The database may contain the following parameters that may be set automatically or by the user using the anomaly setting device 350: an anomaly type; a sequence number of each anomaly when several different anomalies are used in a single password; and a character string replacing the anomaly.

In one example embodiment, where the password protection system 300 monitors the accuracy of the entered password, as well as detects instances where a password has become known to a hacker, the following is also may be set using the anomaly setting device 350: the password string, in which each particular anomaly will be used; and the location of each particular anomaly in the password string.

In an embodiment where the password protection system 300 also functions as an identity authentication system that verifies the user identity only on the basis of entered character passwords and their anomaly parameters and locations stored in database 370, it is not necessary to set sequence of symbols in the password with the anomaly setting device 350.

All information set with the anomaly setting device 350 is transferred into the anomalies database 370 for storage.

Figure 5:
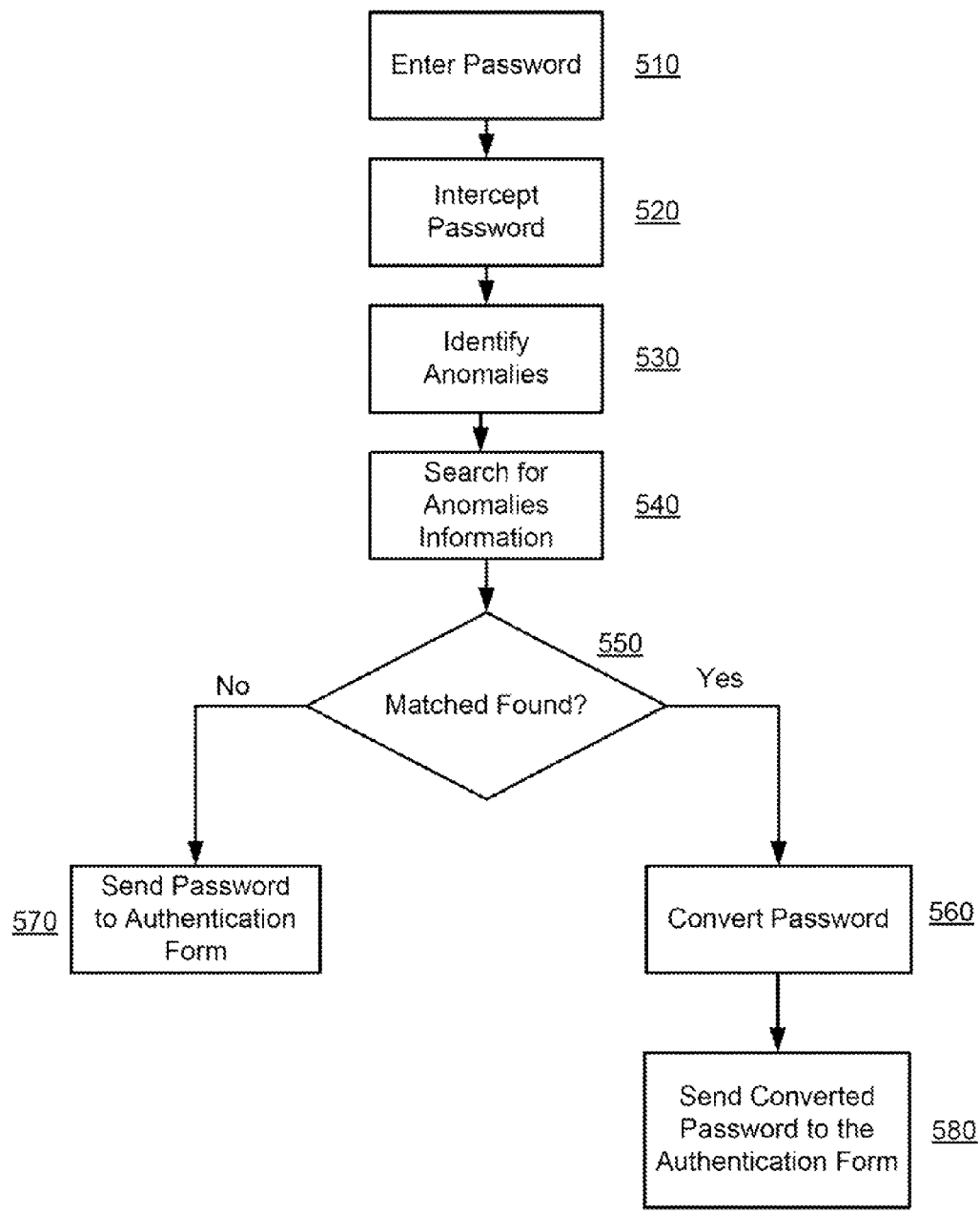
FIG. 5 illustrates a method for password protection in accordance with one example embodiment.

FIG. 5 shows a method of operation of the password protection system in accordance with one example embodiments. Password entry using the input device 110 takes place at step 510. At step 520, the entered password is intercepted by an interception device 310 of the password protection system 300 and transmitted for analysis to the anomaly detection device 320. At step 530, the anomaly detection device 320 detects the entered password's anomalies and their parameters, which may include anomaly type, anomaly sequence number, anomaly location in the password, and then transmits the password, together with its anomalies' parameters, to the password conversion device 330. At step 540, the password conversion device 330 searches anomaly database 370 for any matches of detected anomalies' parameters with the preset anomalies. If such matches are found at step 550, the password anomalies will be replaced at the step 560 with the corresponding character strings, and the converted password will be transmitted at the step 580 to the identity authentication form 140. If no matches are detected, the password will be transmitted at the step 570 to the identity authentication form 140 without any conversion.

Figure 6:
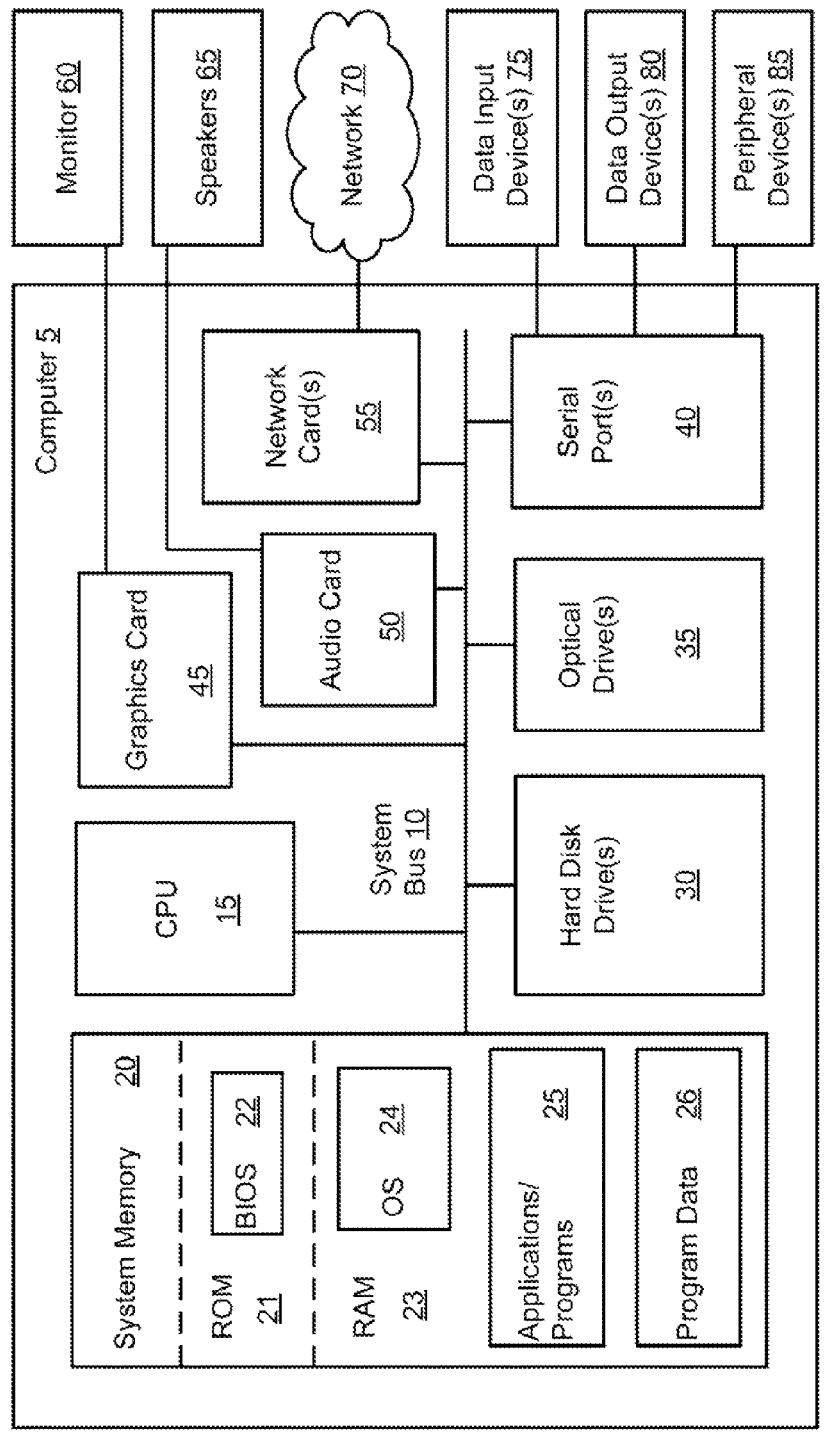
FIG. 6 illustrates a schematic diagram of a computer system in accordance with one example embodiment.

FIG. 6 depicts an example embodiment of a computer system 5 on which password protection system 300 may be deployed. The computer system 5 may include a network server, a personal computer, a notebook, a tablet, a smart phone or other types of data processing or computing devices. Computer 5 may include one or more processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional or other type of operating system, that is responsible for management and coordination of processes and allocation and sharing of hardware resources in computer system 5. System memory 20 also stores applications and programs 25, such as services 306. System memory 20 also stores various runtime data 26 used by programs 25.

Computer system 5 may further include hard disk drive(s) 30, such as SATA magnetic hard disk drive (HDD), and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative embodiments of the computer system.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various embodiments, the algorithms and methods described herein may be implemented in hardware, software, firmware, or any combination thereof. If implemented in software, the functions may be stored as one or more instructions or code on a non-transitory computer-readable medium. Computer-readable medium includes both computer storage and communication medium that facilitates transfer of a computer program from one place to another. A storage medium may be any available media that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave are included in the definition of medium.

In the interest of clarity, not all of the routine features of the embodiments are shown and described herein. It will be appreciated that in the development of any such actual implementation, numerous implementation-specific decisions must be made in order to achieve the developer's specific goals, and that these specific goals will vary from one implementation to another and from one developer to another. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

What is claimed is:

1. A computer-implemented method for password protection, the method comprising:
    intercepting a plurality of data entry events generated by a data entry device, wherein the plurality of data entry events comprise a user-entered password;
    detecting an anomaly event in the plurality of intercepted data entry events;
    comparing the detected anomaly event with one or more preset anomalies;
    if the detected anomaly event matches at least one preset anomaly, identifying a replacement character string associated with said at least one preset anomaly, wherein the associated replacement character string is different from the detected anomaly;
    replacing the detected anomaly event in the plurality of intercepted data entry events with the replacement character string to generate a converted password; and
    sending the converted password instead of the user-entered password to a user authentication device for authentication of the user based at least on the converted password.

2. The method of claim 1, if the detected anomaly event matches a preset anomaly:
    determining one or more parameters of said preset anomaly; and
    comparing each one of the one or more parameters of said preset anomaly with corresponding parameters of the detected anomaly event in order to determine if the detected anomaly event matches the preset anomaly.

3. The method of claim 2, wherein the one or more parameters include:
    a type of the anomaly event;
    a sequence number of the detected anomaly event in the user-entered password if two or more anomalies of the same type are present in the user-entered password; and
    a location of the anomaly event in the user-entered password.

4. The method of claim 1, if the detected anomaly event does not match any of the preset anomalies, sending the user-entered password to the user authentication device for authentication of the user without conversion of the user-entered password.

5. The method of claim 1, wherein the anomaly event includes one or more of:
    a predefined time delay between data entry events;
    an overlay of two or more data entry events; and
    a predefined sequence of two or more data entry events.

6. The method of claim 1, wherein a data entry event is a keystroke or a mouse click.

7. The method of claim 1 further comprising one or more of:
    providing a first user interface for setting a password, one or more anomaly events associated with said password and one or more associated replacement character strings;
    providing a second user interface for training a user to correctly enter anomaly events during entry of the of the user-entered password into the data entry device; and
    collecting data on successful and unsuccessful attempts to enter the password and providing said data to the user.

8. A computer-based system for password protection, the system comprising a plurality of software modules stored in a memory and executable by a processor, the modules comprising:
    a password interception module configured to intercept a plurality of data entry events generated by a data entry device, wherein the plurality of data entry events comprise a user-entered password;
    an anomaly detection module configured to detect an anomaly event in the plurality of intercepted data entry events;
    a database storing one or more preset anomalies and replacement character strings;
    a password conversion module configured to:
        compare the detected anomaly event with the one or more preset anomalies stored in the database;
        if the detected anomaly event matches at least one preset anomaly, identify a replacement character string associated with said at least one preset anomaly, wherein the associated replacement character string is different from the detected anomaly;
        replace the detected anomaly event in the plurality of intercepted data entry events with the replacement character string to generate a converted password; and
        send the converted password instead of the user-entered password to a user authentication device for authentication of the user based at least on the converted password.

9. The system of claim 8, if the detected anomaly event matches a preset anomaly, the password conversion module is further configured to:
    determine one or more parameters of said preset anomaly; and
    compare each one of the one or more parameters of said preset anomaly with corresponding parameters of the detected anomaly event in order to determine if the detected anomaly event matches the preset anomaly.

10. The system of claim 9, wherein the one or more parameters include:
    a type of the anomaly event;
    a sequence number of the detected anomaly event in the user-entered password if two or more anomalies of the same type are present in the user-entered password; and
    a location of the anomaly event in the user-entered password.

11. The system of claim 8, if the detected anomaly event does not match any of the preset anomalies, the password conversion module sends the user-entered password to the user authentication device for authentication of the user without conversion of the user-entered password.

12. The system of claim 8, wherein the anomaly event includes one or more of:
    a predefined time delay between data entry events;
    an overlay of two or more data entry events; and
    a predefined sequence of two or more data entry events.

13. The system of claim 8, wherein a data entry event is a keystroke or a mouse click.

14. The system of claim 8 further comprising one or more of:
- an anomaly setting module configured to allow the user to set a password, one or more anomaly events associated with said password and one or more associated replacement character strings;
- a user training module configured to train the user to correctly enter anomaly events during entry of the of the user-entered password into the data entry device; and
- a logging and warning module configured to collect from the password conversion module data on successful and unsuccessful attempts to enter the password and provide said data to the user.

15. A computer program product embedded in a non-transitory computer-readable storage medium, the computer-readable storage medium comprising computer-executable instructions for password protection, the medium comprising instructions for:
- intercepting a plurality of data entry events generated by a data entry device, wherein the plurality of data entry events comprise a user-entered password;
- detecting an anomaly event in the plurality of intercepted data entry events;
- comparing the detected anomaly event with one or more preset anomalies;
- if the detected anomaly event matches at least one preset anomaly, identifying a replacement character string associated with said at least one preset anomaly, wherein the associated replacement character string is different from the detected anomaly;
- replacing the detected anomaly event in the plurality of intercepted data entry events with the replacement character string to generate a converted password; and
- sending the converted password instead of the user-entered password to a user authentication device for authentication of the user based at least on the converted password.

16. The product of claim 15, if the detected anomaly event matches a preset anomaly, the medium further comprises instructions for:
- determining one or more parameters of said preset anomaly; and
- comparing each one of the one or more parameters of said preset anomaly with corresponding parameters of the detected anomaly event in order to determine if the detected anomaly event matches the preset anomaly.

17. The product of claim 16, wherein the one or more parameters include:
- a type of the anomaly event;
- a sequence number of the detected anomaly event in the user-entered password if two or more anomalies of the same type are present in the user-entered password; and
- a location of the anomaly event in the user-entered password.

18. The product of claim 15, if the detected anomaly event does not match any of the preset anomalies, the medium further comprises instructions for sending the user-entered password to the user authentication device for authentication of the user without conversion of the user-entered password.

19. The product of claim 15, wherein the anomaly event includes one or more of:
- a predefined time delay between data entry events;
- an overlay of two or more data entry events; and
- a predefined sequence of two or more data entry events.

20. The product of claim 15 further comprises instructions for one or more of:
- providing a first user interface for setting a password, one or more anomaly events associated with said password and one or more associated replacement character strings;
- providing a second user interface for training a user to correctly enter anomaly events during entry of the of the user-entered password into the data entry device; and
- collecting data on successful and unsuccessful attempts to enter the password and providing said data to the user.

* * * * *